Patented Apr. 23, 1935

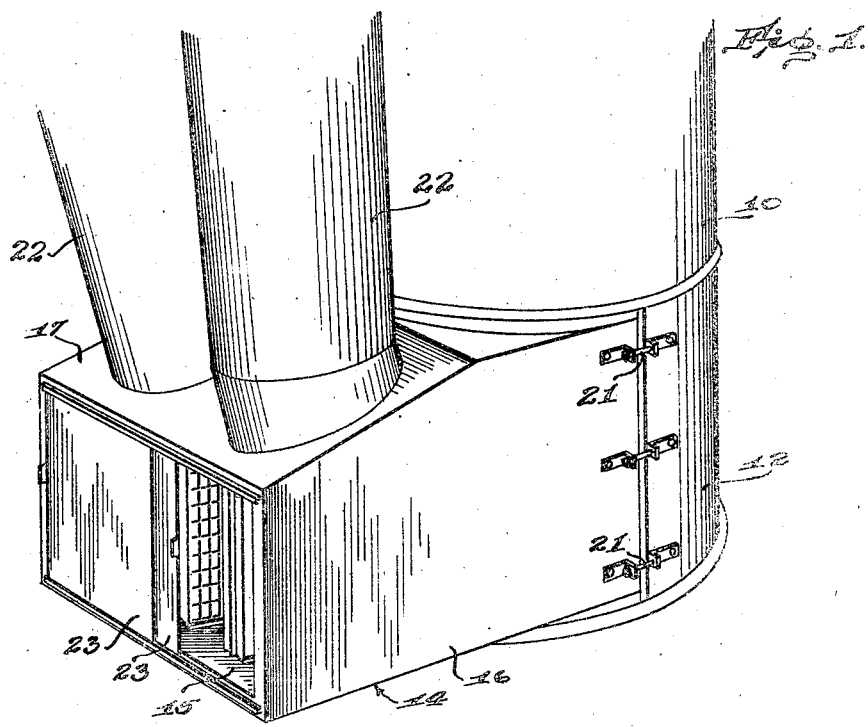
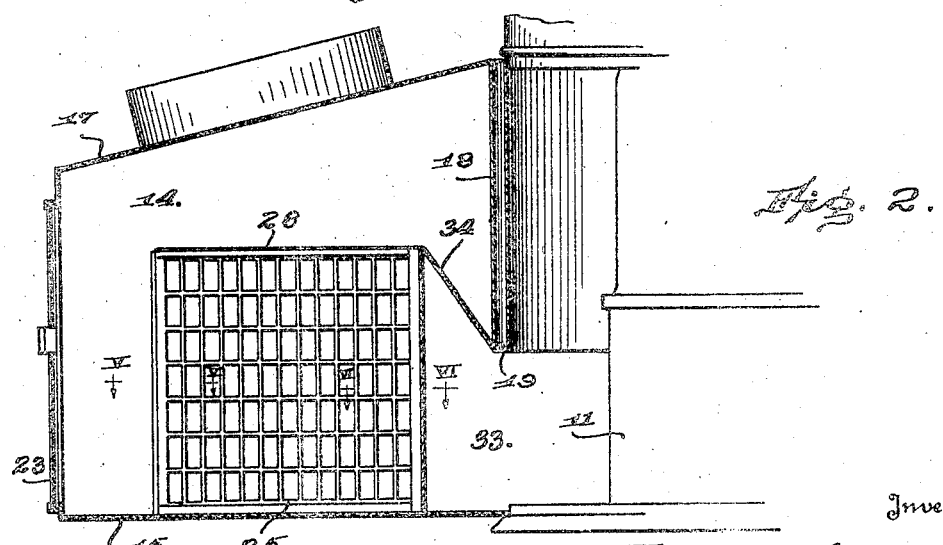

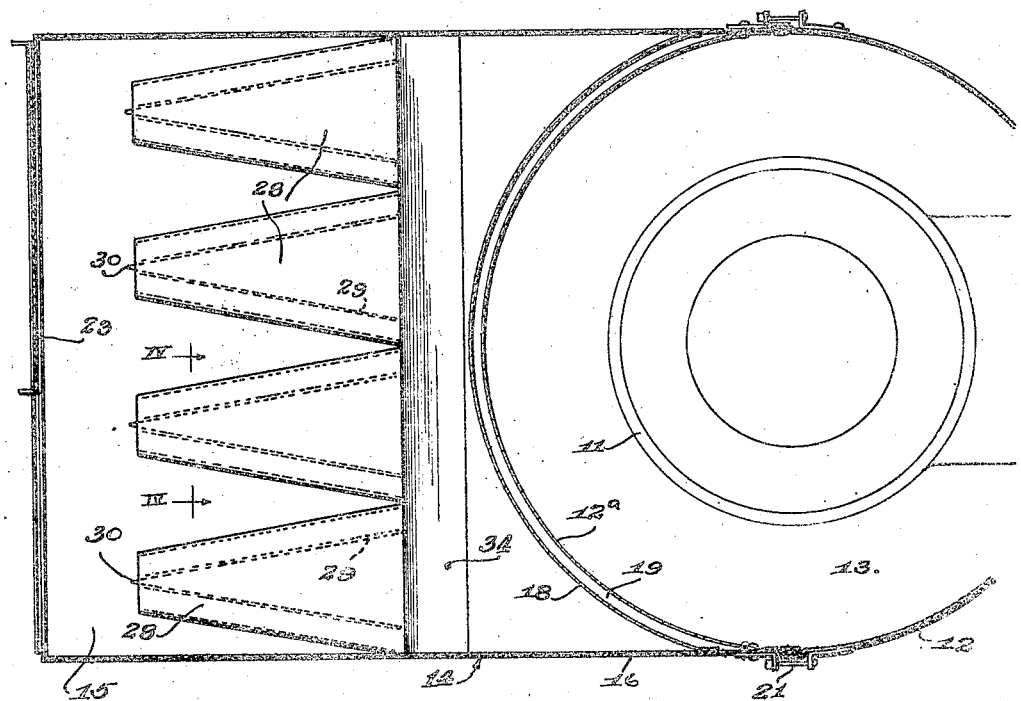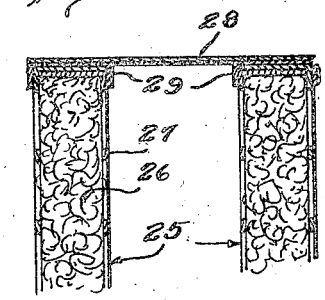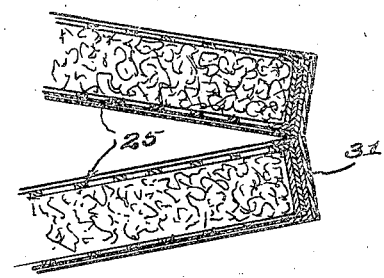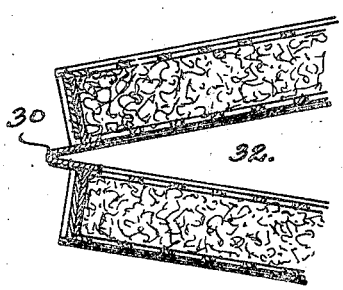

1,999,142

UNITED STATES PATENT OFFICE 1,999,142

AIR FILTER SYSTEM

Frank L. Myers, Toledo, Ohio, assignor to Owens-Illinois Glass Company, a corporation of Ohio Application October 7, 1932, Serial No. 636,628

2 Claims. (Cl. 126—99)

My invention relates to air filter systems designed for use with warm air furnaces of the type in which the circulation of the heating air is controlled by gravity.

An object of the invention is to provide a novel and convenient construction and arrangement in which the air filter units which are contained within the air circulating system are easily and quickly removable and replaceable by other filter units and in which said units are fully protected and enclosed while in use.

A feature of the invention consists in the provision of a novel arrangement by which the air supplied to the furnace to be heated may comprise either the air returned through the usual cold air pipe or pipes, or air drawn into the circulating system directly from the room or basement in which the furnace is installed, or a combination of both systems, all of the air being caused to pass through the filters. The invention also contemplates means for adjustably regulating the amount of air or the rate at which the air is drawn from the outside into the circulating system.

A further object of the invention is to provide a practical construction in which the filter units are contained within an air filter chamber which opens into the usual warm air chamber surrounding the fire pot of the furnace, said chambers being combined to form a part of the furnace assembly.

Other objects of the invention will appear hereinafter.

In the accompanying drawings:

Fig. 1 is a fragmentary perspective view of a gravity type warm air furnace equipped with an air filter system in accordance with the present invention.

Fig. 2 is a sectional elevation of the same.

Fig. 3 is a sectional plan view showing the furnace and air filter system.

Fig. 4 is a section at the line IV—IV on Fig. 3.

Figs. 5 and 6 are sections at the lines V—V and VI—VI, respectively, on Fig. 2.

In the drawings the present invention is illustrated in connection with a conventional warm air furnace 10 of the type in which the air is caused to circulate by gravity. The fire pot or body 11 of the furnace is surrounded by a sheet metal wall comprising semi-circular sections 12 and 12a providing a warm air chamber 13. An air filter chamber 14 at the rear of the furnace is provided by means of a box-like sheet metal structure comprising a floor 15, side walls 16, a top cover portion 17, and a front wall 18. The wall 18 is substantially semi-circular and parallel or concentric with the wall 12a and spaced a short distance therefrom to provide a dead air space 19 which prevents radiation of heat into the chamber 14. The section 12a and the wall 18 are preferably both riveted or otherwise secured directly to the walls 16, thereby forming part of a detachable unit including the chamber 14 in which the filters are contained. This unit is removably attached to the furnace as by means of draw bolts 21.

The air which has been heated in the chamber 13, after circulating through the rooms to be warmed thereby, is returned as usual through a return pipe or pipes 22 which communicate through openings in the top 17, with the cold air box or chamber 14. The rear end of the box 14 comprises a sliding door or doors 23 which may be left open to any desired extent for the purpose of permitting more or less air to be drawn directly from the outside into the air circulating system. These doors may also be opened wide or withdrawn to permit insertion or removal of air filter units 25 which are installed within the chamber 14. The filter units may be rectangular in shape, as shown, and each unit comprises a pad 26 of filtering material within an openwork cover or container 27. The specific construction of the individual filter units is not a part of the present invention and need not be set forth in detail herein.

Within the chamber 14 is a framework for supporting the filter units and providing a partition between the filtered and unfiltered air sections of the chamber. Said framework includes a series of horizontal V-shaped sheet metal plates 28, on the under surfaces of which are secured horizontally disposed channels or guides 29 to receive the upper ends of the filter units, permitting said units to be slid into and out of the frame.

By reference to Fig. 3, it will be seen that the plates 28 are in close proximity or contact with each other at their bases or forward ends. Vertical sheet metal strips 30 which, as shown in Fig. 5, are of V-shape in cross-section, extend upward from the floor 15 of the filter chamber to the rear ends of the plates 28, forming a support for said plates and also forming dividing walls between the compartment of the filter chamber containing the unfiltered air and the space containing the filtered air. Vertical sheet metal strips 31 at the forward ends of the filter units in like manner separate between the filtered and unfiltered air spaces. It will be seen that with this construction the air entering the chamber 14 must pass through the air filters before it can reach the chamber 13 for reheating. The air after passing through the filters enters the V-shaped spaces 32 beneath the plates 28 and thence into a chamber or passageway 33 which opens into the heating chamber 13. An inclined wall 34 extending downwardly and forwardly from the plates 28 to the wall 18, cooperates with said plates to separate the chamber 14 from the space containing the filtered air. The filter units can be quickly removed by opening the doors 23 and withdrawing said units from the slideways 29, and replaced by new units.

Modifications may be resorted to within the spirit and scope of my invention.

What I claim is:

1. An air heating and filtering system comprising a furnace body, a casing surrounding and spaced therefrom to provide a warm air chamber, said casing comprising a substantially semi-cylindrical detachable section, an air filter chamber connected to said detachable section and removable therewith as a unit from the furnace, said air filter chamber comprising separate compartments and a semi-cylindrical wall concentric with and spaced from said detachable section, and an air filter between said compartments.

2. An air heating and filtering system comprising a furnace body, a circular sheet metal wall surrounding and spaced from said body to provide a warm air chamber, an air filter box comprising side walls substantially tangent to said first mentioned wall and a semi-cylindrical front wall curved to conform to the curvature of said first mentioned wall and spaced therefrom to provide a dead air space between the curved walls for preventing radiation of heat to the filter box, and an air filter within said box, said circular wall comprising a detachable section extending across the filter box and attached in a fixed position to the side walls thereof, said box and wall section being removable as a unit from the furnace.

FRANK L. MYERS.